United States Patent [19]
Wiley, Jr.

[11] 3,757,327
[45] Sept. 4, 1973

[54] RADAR PRESENCE DETECTION AT PRESELECTED RANGE

[75] Inventor: Wallace F. Wiley, Jr., Prairie Village, Kans.

[73] Assignee: Bonzer Inc., Overland Park, Kans.

[22] Filed: Dec. 29, 1971

[21] Appl. No.: 213,645

[52] U.S. Cl. ............... 343/7.5, 325/428, 343/7 ED, 343/13 SA
[51] Int. Cl. .............................................. G01s 9/04
[58] Field of Search .................... 325/428; 343/7.5, 343/13 SA, 13 R, 7 ED

[56] References Cited
UNITED STATES PATENTS

| | | | |
|---|---|---|---|
| 3,005,194 | 10/1961 | Goodell et al. | 343/112 CA |
| 3,545,861 | 12/1970 | Farnsworth et al. | 343/13 R X |
| 3,538,507 | 11/1970 | Wiley, Jr. | 343/7.5 |
| 3,538,506 | 11/1970 | Wiley, Jr. | 343/7 ED |
| 2,984,833 | 5/1961 | Nieset et al. | 343/13 SA |
| 2,980,905 | 4/1961 | Gratian et al. | 343/13 SA |
| 2,975,414 | 3/1961 | Bogle | 343/13 R |

Primary Examiner—Malcolm F. Hubler
Attorney—Herbert W. Kenway, Henry D. Pahl, Jr., et al.

[57] ABSTRACT

The radar apparatus disclosed herein employs a superregenerative oscillator for detecting the presence of a target at a preselected range or distance. The bias signal which controls the nominal squeg period of the oscillator is repetitively switched between two levels corresponding to respective predetermined ranges. A reference signal is provided in synchronism with the switching. A reduction in the random noise generated by the oscillator is taken as indicative of the presence of a target at the preselected range corresponding to the squeg rate at which the oscillator is then operating. The reference signal and a signal representing the noise amplitude are combined such a way that a null is obtained when a target is present at the range corresponding to a predetermined one of the two squeg rates.

6 Claims, 3 Drawing Figures

RADAR PRESENCE DETECTION AT PRESELECTED RANGE

BACKGROUND OF THE INVENTION

This invention relates to super-regenerative radar apparatus and more particularly to such apparatus which is relatively insensitive to interfering signals.

In one embodiment, the present invention is an improvement on the SUPER-REGENERATIVE TARGET DETECTION SYSTEM disclosed in my U. S. Pat. No. 3,538,507 which issued Nov. 3, 1970. That prior system employs a super-regenerative oscillator as both transmitter and receiver for radar purposes. As is understood with regard to such oscillators, the oscillator generates repetitive burst of oscillations. These bursts, or at least selected ones, are employed as the transmitted signal. As is also understood, there is an interval occurring just prior to each burst of oscillations during which the operation of the oscillator is quite sensitive to received energy at the oscillator's characteristic frequency.

In the system disclosed in my prior patent, the oscillator generates burst of oscillations in pairs, the first burst providing the transmitted energy while the portion of the cycle which includes the second burst is employed in detecting energy reflected from the targets. The pairing of the bursts of oscillations is obtained by means of a mono-stable multivibrator which alternately triggers and is triggered by the super-regenerative oscillator. By providing an interval between successive pairs of bursts which is long with respect to the interburst interval, the redundancy which may otherwise appear using super-regenerating radar systems is avoided. When a target is not present at the predetermined range corresponding to the squeg period of the super-regenerative oscillator, there is a substantial random variation in the onset of the second burst of oscillations and this variation appears as noise in the output signal of the oscillator. On the other hand, when a target is present at the predetermined range, the reflected signal is received during the oscillator's sensitive period and thus stabilizes the onset of the second burst of oscillations, thereby reducing the noise in the output signal. In the system of the prior patent, the proportion of time the mono-stable multivibrator spends in its stable state is taken as an output parameter and a reduction in random variation in this proportion is then indicative of the presence of a target at the predetermined range corresponding to the squeg period. This operation is explained in greater detail in the 3,538,507 patent.

In common with other types of radar systems, the system of the prior patent is subject to interference by extraneous signals, particularly by coherent signals which are at sub-stantially the same frequency band as the characteristic frequency of the super-regenerative oscillator.

Among the several objects of the present invention may be noted the provision of radar apparatus which is relatively insensitive to interfering signals; the provision of such apparatus which will detect the presence of a target at a preselected range without ambiguity; the provision of such apparatus which is highly reliable; and the provision of such apparatus which is relatively simple and inexpensive. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
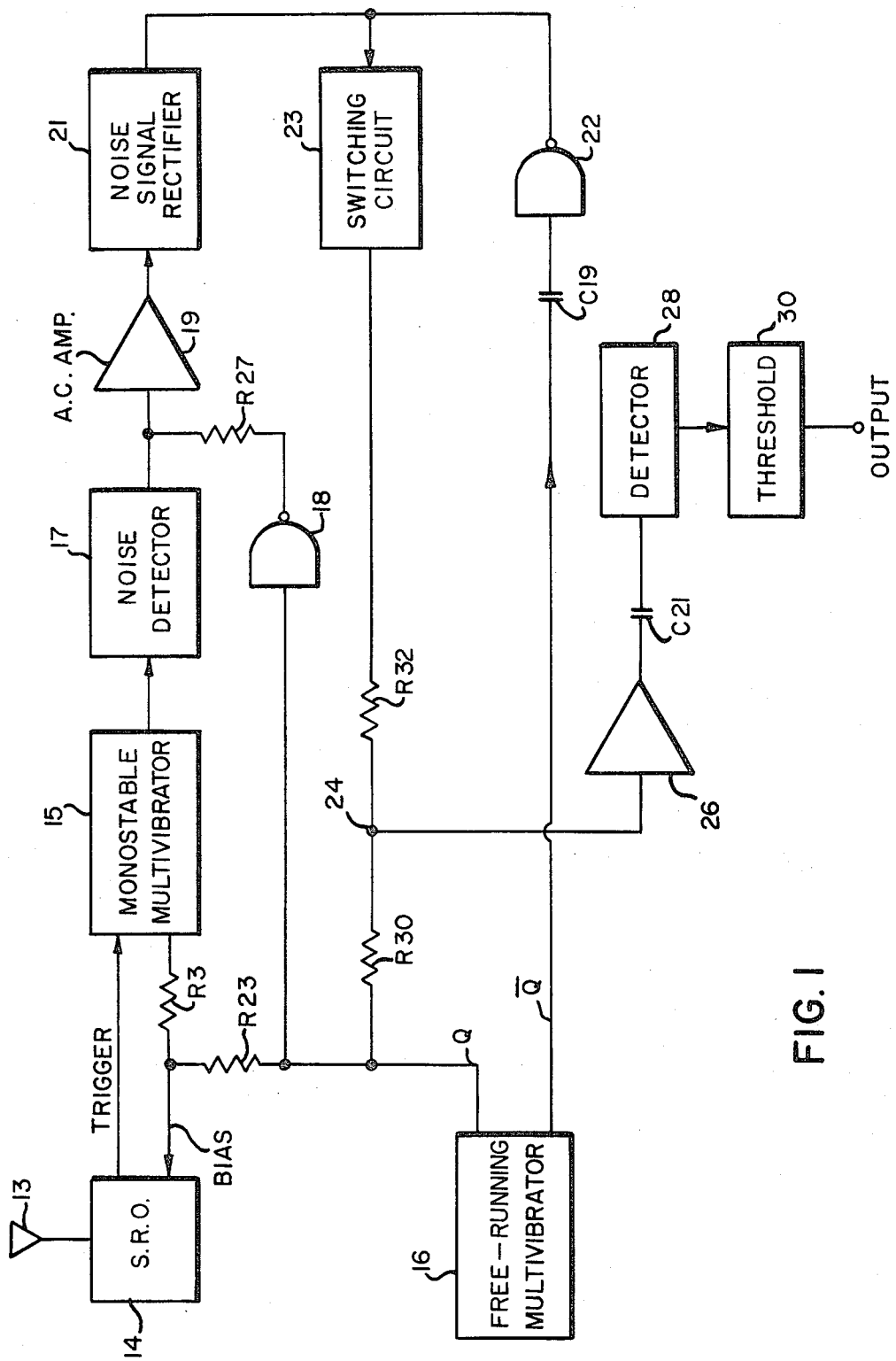
FIG. 1 is a block diagram of radar apparatus constructed in accordance with the present invention.

Referring now to the drawings, the apparatus illustrated is particularly adapted for use as a fixed range altimeter. In other words, the apparatus is adapted to detect the presence of a target, i.e. ground, at a preselected range. Such altimeters are useful for controlling the opening of supply drop parachutes or for providing a ground proximity warning in the case of aircraft. With reference to FIG. 1, the system illustrated there employs many components in common with the system described in my prior U.S. Pat. No. 3,538,507 and corresponding reference characters have been employed wherever possible and particularly in the block diagram.

With reference to FIG. 1, a super-regenerative oscillator 11 is provided which bidirectionally coupled to an antenna 13. As will be apparent hereinafter, antenna 13 may in fact comprise at least a portion of the tuned circuit of the oscillator. As is understood by those skilled in the art, a super-regenerative oscillator such as that indicated at 11 will, when appropriately biased, periodically break into oscillations at a characteristic frequency. The rate at which the burst of oscillations are repeated is typically referred to as the squeg rate and this rate is variable as a function of the biasing of the oscillator. The components of the oscillator are selected so that the periodically occurring oscillations are at a characteristic frequency, e.g. 400 megacycles, which is appropriate for radar purposes in the intended application.

The biasing of oscillator 11 is controlled by a pair of multivibrator circuits, a mono-stable or single-shot multivibrator 15 and an astable or free-running multivibrator 16. As will become more apparent hereinafter, the characteristics and time constants of free-running multivibrator 16 are selected so that its operating frequency is substantially lower than the repetition frequency at which the mono-stable multivibrator 15 normally operates in conjunction with the oscillator 11. As is understood by those skilled in the art, a mono-stable multivibrator is a switching type circuit having two distinct states, one of which is stable and the other of which is unstable. When the circuit is at rest in its stable state, a triggering signal applied thereto will cause it to switch to its unstable state. Once triggered, the circuit will remain in the unstable state for a predetermined time interval and then revert automatically to the stable state. For a relatively brief period or delay following the reversion to the stable state, the circuit is substantially insensitive to triggering signals. As is likewise understood, a free-running multivibrator is also a switching type circuit having two distinct states. In the free-running multivibrator, both states are unstable and the circuit repetitively cycles between its two states at a predetermined frequency.

The coupling between the mono-stable multivibrator 15 and the oscillator 11 is selected to that, in the unstable state of the multivibrator 15, the oscillator is completely cut off irrespective to the state of free-running multivibrator 16. When the mono-stable multivibrator 15 is in its stable state, the bias applied to the oscillator 11 is such that it will squeg at one of two predetermined squeg rates, the particular squeg rate being dependent upon the then existing state of the free-running multivibrator 16. In the present apparatus then the ocillator 11 and the mono-stable multivibrator 15 operate, in general, in the manner described in the 3,538,507 patent, to detect the presence of a target at a preselected range, that is, the squegging of the oscillator triggers the mono-stable multivibrator and the multivibrator then provides a delay during which the oscillator is cut off. When the bias signal is again re-applied the first burst of oscillations will not trigger the mono-stable multivibrator since it is then in an insensitive condition. Thus the burst or squegging occurs in pairs.

As in the system of the prior patent, the output signal from the unstable multivibrator 15 is applied to a peak detector 17 which is responsive to the proportion of time the mono-stable multivibrator 15 spends in its stable state. In the absence of a target at the range corresponding to the then extant squeg rate, the random variation in the duty cycle of the mono-stable multivibrator will cause the detector 17 to provide a signal which is conveniently designated the noise signal. The a.c. components of this noise signal are then amplified as indicated at 19 and applied to a noise signal rectifier 21. This latter detector provides an output signal which essentially represents the noise signal amplitude or envelope. This noise amplitude signal is then applied to a switching circuit which effectively operates to provide a squarewave signal, i.e. one which is at a first level when substantial noise is present and is at a second level in the absence of significant noise.

As thus far described, the operation is essentially similar to that provided by the system described in the 3,538,507 patent. However, under the influence of the free-running multivibrator 16, the range at which the oscillator 11 is sensitive, is periodically switched between two different distances.

As the switching of the oscillator bias signal between the two different levels under control of the free-running multivibrator 16 also produces a periodic variation in the output signal from the peak detector 17, a compensating signal component is supplied, through an isolating resistor, from an inverter 18 which is driven by the multivibrator signal. The amplitude of this compensating component is selected so that, in the absence of a target at either of the preselected ranges, there is substantially no periodic variation noise signal amplitude at the frequency of the free-running multivibrator As an abrupt transient is also introduced into the detector circuitry of the moment of transition between the two levels, this transient signal is eliminated by means of a compensating signal applied to the output of the noise signal rectifier 21. This latter compensating signal is derived from the completmentary output Q of the free-running multivibrator 16. This complementary signal is differentiated by means of a capacitor C1 to obtain a pulse of short duration and this short pulse is applied, through an inverter 22, to the output of the noise signal rectifier 21.

As thus far described, the system of FIG. 1 is adapted to provide, at the output of switching circuitry 23 a circuit of which indicates whether a target is present at the two different ranges in alternation. Taking into consideration the mode of operation described in my prior patent and the various compensating signals part as described above, it can be seen that the output signal from the switching circuit 23 will be essentially d.c. when no target is present at either of the preselected ranges; will be a squarewave signal of one phase when a target is present at one of the selected ranges; and will be a squarewave of inverted or opposite phase when a target is presented at the other of the two preselected ranges. Although such a situation would not typically occur, it may be seen that the output signal circuit from the switching circuit 23 would also be essentially d.c. if equally strong returns were received from targets present at both predetermined ranges.

In order to detect when a target is present only at a preselected one of the two possible ranges, the output signal from the detection system is combined with a phase reference signal obtained from the free-running multivibrator 16. In this way, a positive indication is obtained only when a target is present at a predetermined one of the two possible ranges. As will be understood by those skilled in the art, this is a form of coherent demodulation of the output signal synchronously with the initial modulation of the oscillator by the free-running multivibrator 16.

In the embodiment of FIG. 1, the noise amplitude signal obtained from the switching circuit 23 is mixed with the phase reference signal in a network comprising resistors R30 and R32. The resultant or mixed signal is then amplified as indicated at 26 and the a.c. components of the amplified signal are applied, by means of a capacitor C21, to a detector 28 which provides a d.c. signal whose value corresponds to the amplitude of that a.c. component. This d.c. level is then applied to a threshold circuit 30 so that an output signal is generated at a terminal when the d.c. level falls below a predetermined value.

When no target is present, it will be seen that the combined signal at junction 24 will include a substantial a.c. component, actually a squarewave, due to the contribution of the reference signal. When a target is present at a predetermined one of the two possible ranges, however, the squarewave signal thereby produced by the switching circuit 23 will be out-of-phase with the reference signal. Assuming that the values of the resistors R30 and R32 are appropriately chosen, it will be seen that the out-of-phase squarewave components will be balanced out and the resultant combined signal will not contain any significant a.c. component. Accordingly, the output signal from the detector 28 will fall below the operating point of the threshold circuit 30 and an output signal indicating the presence of a target will be generated. On the other hand, since the presence of a target at the other of the two ranges will produce, from the switching circuit 23, an output signal which is of reversed phase, the two squarewave signals applied to the summing junction 24 will add to rather than offset each other and a substantial a.c. component will result. The d.c. level thereby generated will keep the threshold circuit from providing the target indication at the output terminal.

An important advantage of the system of the present invention is that it is relatively insensitive to interfering signals, even though such interfering signals may be at essentially the same frequency as the operating frequency of oscillator 11. Since the oscillator 11 is modulated by the free-running multivibrator 16 so as to provide two different squeg rates and since the output signal from the noise signal detector system is coherently demodulated, it may be seen that the system is responsive only to signals which are modulated in the same fashion.

Since the oscillator system is modulated between two different target ranges rather than being subjected to some form of amplitude modulation, the output signal of the noise amplitude detector system is not modulated except when a target is present at one or the other of the two possible ranges. This minimizes the compensation which must be provided to preserve the target/no target distinction.

Figure 2:
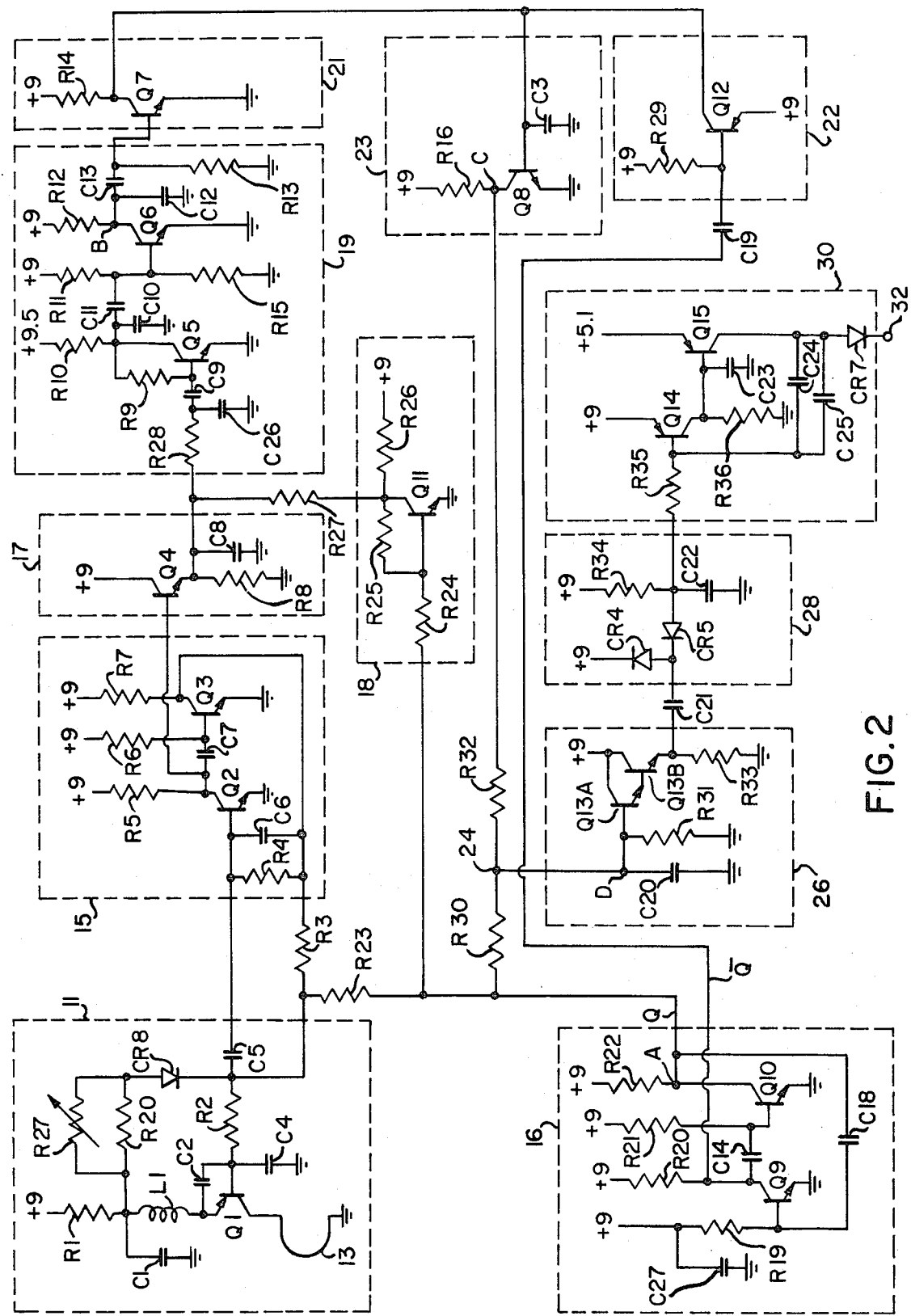
FIG. 2 is a schematic circuit diagram of the radar apparatus in FIG. 1.

FIG. 2 illustrates a particular circuit design having the functional organization of FIG. 1. In FIG. 2, the circuit components comprising a given one of the blocks in FIG. 1 are grouped witin a broken line block. As mentioned previously, many portions of the present system are similar in both function and construction to corresponding designated portions of the circuit described in my prior U. S. Pat. No. 3,538,507. Accordingly, such portions of the FIG. 2 circuit are not described in detail herein.

The free-running multivibrator 16 comprises the transistors Q9 and Q10 provided with conventional cross coupling as illustrated. The Q output signal from the multivibrator is taken from the collector of transistor Q10 and is applied, through resistor R23, to the oscillator circuit, together with the bias control signal obtained from the mono-stable multivibrator 15 which is applied through resistor R3. Transistor Q11 functions as the inverter 18 in applying a compensating signal to the output of the noise detector 17.

The Q signal from multivibrator 16 is taken from the collector of transistor Q9 and is differentiated by capacitor C19. Transistor Q12 provides the function of inverter 22 for the differentiated signal. The combined signal obtained by mixing the phase reference signal and the squarewave noise amplitude signal is applied to a Darlington connected transistor pair Q13A and Q13B which provide the function of amplifier 26. The diodes CR4 and CR5 provide the function of detector 28 in generating a d.c. signal whose level is proportional to the amplitude of the a.c. component of the combined signal, this d.c. level being stored on the capacitor of C22. Transistor Q14 provides a d.c. amplification and while the transistor Q15, provides the threshold detection function.

A commercial version of the circuit of FIG. 2 has been built and successfully operated in which the component values and type designations were in accordance with the following table.

Resistors in ohms

| | | | |
|---|---|---|---|
| R1 100 | R10 1k | R19 470k | R28 100 |
| R2 10 | R11 33k | R20 4.7k | R29 220k |
| R3 47k | R12 4.7k | R21 470K | R30 1.2m |
| R4 22k | R13 10k | R22 4.7k | R31 2.2m |
| R5 1k | R14 2.2m | R23 680k | R32 1m |
| R6 47k | R15 4.7k | R24 1m | R33 1k |
| R7 1k | R16 100k | R25 1m | R34 100k |
| R8 1k | R17 2.2k | R26 1k | R35 100k |
| R9 2.2m | R18 470 | R27 470 | R36 10k |

Capacitors in microfarads except as noted

| | | | |
|---|---|---|---|
| C1 4.7 | C8 1.0 | C15 4.7 | C22 0.1 |
| C2 2.2 pt | C9 0.1 | C16 4.7 | C23 4.7 |
| C3 0.1 | C10 0.1 | C17 22 | C24 4.7 |
| C4 10 pt | C11 0.1 | C18 0.1 | C25 4.7 |
| C5 47 pt | C12 0.1 | C19 .01 | C26 0.1 |
| C6 22 pt | C13 0.1 | C20 .01 | C27 4.7 |
| C7 .001 | C14 1.0 | | C21 1.0 |

| Transistor types | | Diodes |
|---|---|---|
| Q1 2N4260 | Q9 2N3415 | CR1 4003 |
| Q2 2N3227 | Q10 2N3415 | CR2 4739 |
| Q3 2N3227 | Q11 2N3415 | CR3 5.1v Zener |
| Q4 2N3415 | Q12 2N5367 | CR4 914 |
| Q5 2N3415 | Q13 G.E. D1692 | CR5 914 |
| Q6 2N3415 | Q14 2N5367 | CR6 |
| Q7 2N3415 | Q15 2N5367 | CR7 914 |
| Q8 2N3415 | Q16 2N3415 | CR8 914 |

Inductor L1 = .33 microhenry
Except for CR3, the diode designations are standard 1N numbers.

The entire circuit, including the antenna 13, was constructed at integral assembly in a single circuit board, the antenna comprising a partial loop formed by a conductor following the periphery at one end of the circuit board.

Figure 3:
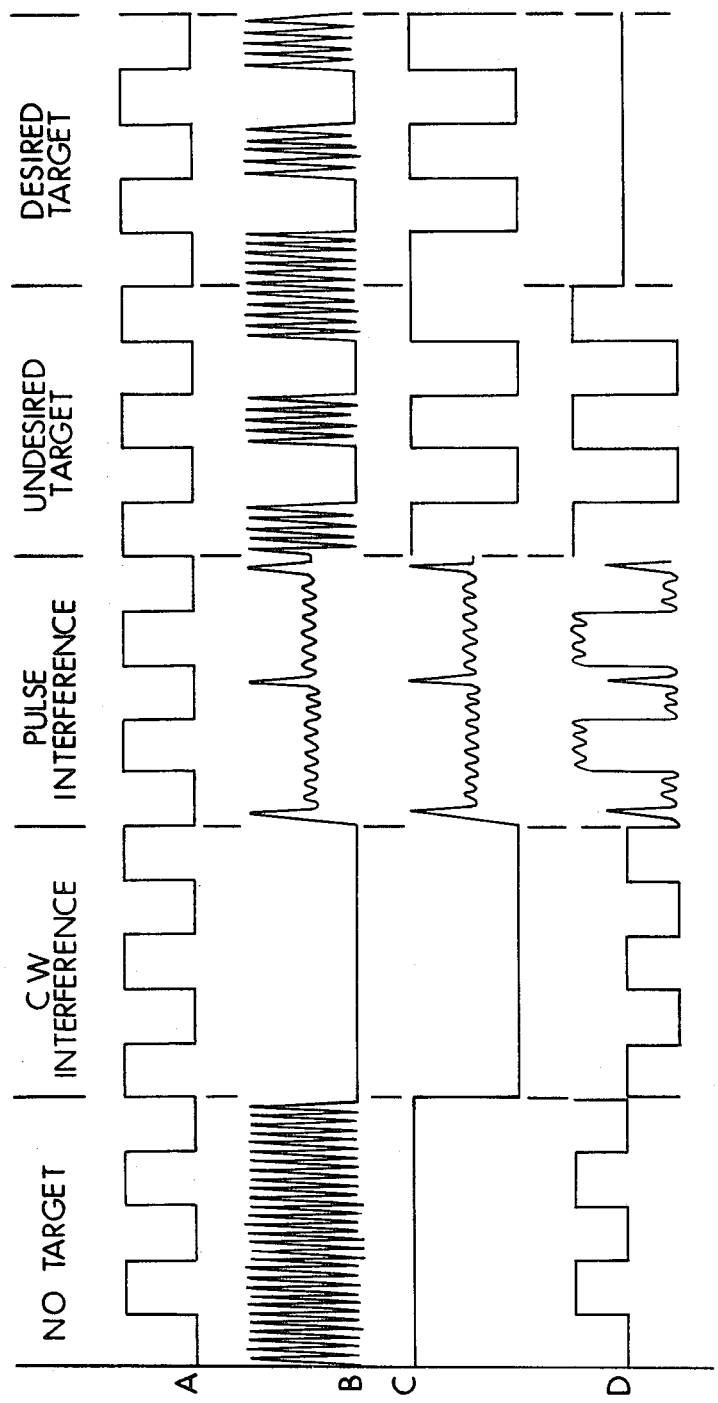
FIG. 3 represents waveforms occurring at various points in the circuit of FIG. 2 under different conditions of operation.

The drawing of FIG. 3 diagrammatically represents waveforms which occur at different points in the circuits of FIG. 2 under various conditions of operation. Each waveform in FIG. 3 has been given a letter designation A-D and the point at which the corresponding waveform appears in the circuit has been given the same designation in FIG. 2. The waveform A, taken from the collector of transistor Q10 in the free-running multivibrator 16, is a squarewave which is unaffected by different target conditions. The waveform B is taken from the collector of transistor Q6 and this is essentially the noise signal. As indicated previously, a substantial noise signal is generated when no target is present. However, continuous wave (c.w.) interference can suppress the noise as indicated in the second segment of the waveform. Likewise, pulse modulated interference, e.g. as may be produced by television broadcasting, can produce a waveform of essentially indefinite character as indicated in the third segment.

When a target is present at the desired one of the two ranges between which the oscillator 11 is modulated, the signal is alternately noisy and quiet as illustrated in the fifth segment of the waveform. The presence of a target at the desired range produces a similar waveform, as shown in the fourth segment, but of reversed phase with respect to a cycle of operation of the modulating multivibrator 16. The C waveform is taken from the collector of transistor Q8 and is thus essentially a signal representing noise amplitude or noise envelope. Essentially then, this signal is based upon the rectification and filtering of the high frequency components in the B waveform.

The combined signal which is applied to the base of transistor Q13 is represented at D. In accordance with the description of operation given previously, this signal comprises a square derived from a phase reference signal when no target is present; a squarewave of increased amplitude when a target is present at the undesired range; and is essentially d.c. when a target is present at the desired range. In the presence of continuous wave interference, the combined signal is still a squarewave derived from the phase reference signal even through the d.c. level may be changed. Similarly, in the presence of pulse modulated interference, the combined signal inhibits substantial a.c. and squarewave components.

In summary, only when the reflected signal received from the target is modulated in a phase consistent with the modulation of the transmitted signal is an a.c. null obtained in the combined signal. Since the output circuitry provides a target only when there is no substantial a.c. component, it can be seen that this apparatus is relatively resistant to interference while providing the desired indication when a target is present at a desired range and, while avoiding range ambiguity.

In view of the foregoing, it may be seen that several objects of the present invention are achieved and other advantageous results have been attained.

As various changes could be made in the above constructions without departing from the scope of the invention, it should be understood that all matter contained in the above described or shown in the accompanying drawings shall be interpreted as illustrative and not in a limiting sense.

What is claimed is:

1. Radar apparatus for detecting the presence of a target at a preselected range, said apparatus comprising:
    means for transmitting and receiving pulsed oscillatory energy, said means being responsive to the presence of a reflective target at a range which is variable by a control signal applied to said means, said means providing a target signal having an amplitude which is reduced in response to the presence of a target at the then extant sensitive range;
    switching means for periodically switching said control signal between two levels, one level corresponding to said preselected range the other corresponding to a different range, said switch-ing means also providing a reference signal which varies in synchronism with the switching; and
    means for combining said target signal and said reference signal in phase opposition to provide a net signal having a minimum constituent at the periodic switching frequency when a target is present at said preselected range.

2. Radar apparatus for detecting the presence of a target at a preselected range, said apparatus comprising:
    a super-regenerative oscillator having a nominal squeg period which varies as a function of a bias signal applied thereto;
    means for providing a bias signal to said oscillator and periodically switching the bias signal between two levels, each level providing a nominal squeg period corresponding to a respective predetermined range, said means also providing a reference signal which varies in synchronism with said switching;
    detector means interconnected with said oscillator for providing a noise envelope signal having an amplitude which varies as a function of the extent of random variation in said squeg period; and
    means for combining said noise envelope signal and said reference signal to provide a net signal having a minimum constituent at the periodic switching frequency when a target is present at a preselected one of said ranges.

3. Radar apparatus as set forth in claim 2 wherein said bias signal-providing means comprises a free-running multivibrator.

4. Radar apparatus as set forth in claim 2 wherein said super-regenerative oscillator is interconnected with a mono-stable multivibrator, the multivibrator being triggered into its astable state by an initial burst of oscillation by said oscillator and being operative, after return to the stable state, to modify the biasing of said oscillator to produce a squeg period which is relatively long in relation to either said predetermined or said different range.

5. Radar apparatus for detecting the presence of a target at a preselected range, said apparatus comprising:
    a super-regenerative oscillator having a nominal squeg period which varies as a function of a bias signal applied thereto;
    a free-running multivibrator circuit for providing two different bias signal levels in periodic alternation corresponding to said preselected range and a different range, respectively, said free-running multivibrator also providing a reference signal which varies in synchronism with said alternation; a mono-stable multivibrator circuit for controlling the application of said bias signal levels to said oscillator, said mono-stable multivibrator circuit having a first state in which said oscillator is biased into super-regenerative oscillation at a squeg rate having a period which corresponds to the return time of a signal reflected from a target at said preselected range, said switching circuit being operative to switch automatically from a second state to said first state afer a substantially predetermined time interval in said second state, said time interval being substantially longer than said return time, said switching circuit being responsive, after a predetermined delay following switching from said second state to said first state, to triggering signals applied thereto for switching from said first state to said second state;
    detector means interconnected with said oscillator for providing a noise envelope signal having an amplitude which varies as a function of the extent of random variation in the proportion of time said mono-stable multivibrator remains in said first state;
    means for combining said noise envelope signal and said reference signal to provide a net signal having a minimum constituent at the periodic switching frequency when a target is present at a preselected one of said ranges; and
    means for providing a target present indication when the net signal constituent at the periodic switching frequency falls below a predetermined threshold.

6. Radar apparatus as set forth in claim 3 wherein said reference signal is square-wave and wherein said system includes means for producing a square-wave signal from the a.c. component of said noise envelope signal, said square-wave signals being combined in phase opposition when the noise signal is modulated by the presence of a target at said preselected range.

* * * * *